United States Patent Office 2,760,948
Patented Aug. 28, 1956

2,760,948

POLYESTER PRODUCTS, INCLUDING DI AND TRI-ISOBUTENYL SUCCINIC ACID AS COMPONENTS

Eugene W. Moffett and Earl E. Parker, Milwaukee, Wis., assignors to Pittsburgh Plate Glass Company No Drawing. Application January 30, 1952, Serial No. 269,112

7 Claims. (Cl. 260—40)

The present invention relates to the provision of polyesters of dihydric alcohols and a mixture of an alpha-beta ethylenically unsaturated dicarboxylic acid and diisobutenyl or triisobutenyl succinic acid.

It has heretofore been suggested to provide resinous products by conjointly polymerizing appropriate vinylic or ethylenic compounds (often termed monomers) such as styrene, vinyl acetate, methacrylic acid and the like, with polyesters of dihydric alcohols and unsaturated dicarboxylic acid such as maleic acid, fumaric acid, itaconic acid or the like containing the group —C=C—C=O where there is carbon-oxygen conjugation. It has further been suggested to substitute for a portion of the unsaturated dicarboxylic acid of the polyesters, an acid free of functioning unsaturation and being represented by phthalic acid, succinic acid, adipic acid and the like. The preparation and use of the resultant resinous products is illustrated in many patents of which the following are typical examples: 2,409,633, 2,433,735, 2,443,741, and 2,450,552.

According to this invention, a novel resin and polymers and copolymers thereof, have been provided. This resin is a polyester of a dihydric alcohol and an acid of the group consisting of diisobutenyl succinic acid and triisobutenyl succinic acid. Mixed polyesters of a dihydric alcohol, an acid of the above group and alpha-beta ethylenically unsaturated dicarboxylic acid also have been provided and are especially valuable for production of resins having high dielectric strength. These esters may be copolymerized with other polymerizable materials or may be polymerized alone to produce valuable resinous products. When these mixed esters are polymerized with styrene, divinyl benzene or like aromatic compounds having the group CH$_2$=CH— linked to an aromatic nucleus, resins of outstandingly good dielectric strengths and power factors have been obtained.

The preparation of a mixed polyester of an ethylenically unsaturated dicarboxylic acid and triisobutenyl or diisobutenyl succinic acid follows substantially the techniques that have heretofore been employed in the preparation of the simple polyesters of a dihydric alcohol such as those listed in the above patents or the art cited therein, and an ethylenically unsaturated dicarboxylic acid or the polyesters of such dihydric alcohols and mixtures of ethylenically unsaturated dicarboxylic acids, e. g. maleic or fumaric acid, and dicarboxylic acids free of ethylenic unsaturation such as phthalic acid, succinic acid, adipic acid or the like. Thus these novel polyesters can conveniently be prepared by heating a mixture of the several acids and a dihydric alcohol such as ethylene glycol, diethylene glycol, triethylene glycol, polyethylene glycol, propylene glycol, dipropylene glycol or butanediol-1,4; butanediol-1,3; butanediol-2,3; pentanediol-1,5, or corresponding glycols containing methyl or like non-functioning substituents, for hydrogen in the carbon chains. The glycols preferably are employed in molecular equivalency, or a slight excess thereof, e. g. 10 or 20 per cent by molar excess, with respect to the sum of the acid components in the polyesters to be prepared. However, esters may be prepared using an excess of acid.

Appropriate alpha-beta ethylenically unsaturated dicarboxylic acids for use in the mixed polyesters include maleic acid, fumaric acid, their methyl, or ethyl substitution products, such as methyl or ethyl or dimethyl or diethyl maleic acid. Likewise, the use of such acids containing other non-functioning groups or substituents such as chloro groups, is within the purview of the invention.

Itaconic acid, which includes the group —C=C—C=O and citraconic acid, may be used as the unsaturated dicarboxylic acid. Such other alpha-beta ethylenically unsaturated dicarboxylic acids as are recognized in the art as forming polyesters susceptible of addendum polymerization may be employed without departure from the spirit of the invention.

Wide variations in the relative proportions of the acid components in the mixture are embraced within the scope of the invention. For example, the diisobutenyl or triisobutenyl succinic acid component may be employed in a proportion of 0.25 to 10 or even 15 moles per mole of the alpha-beta ethylenically unsaturated acid component. For example, one may consider as typical, a polyester which is the product of diethylene glycol or propylene glycol and one mole of maleic anhydride and 0.25 to 10 or even 15 moles of triisobutenyl succinic acid or its anhydride. Naturally, triisobutenyl succinic acid can be replaced by a corresponding amount (molecularly) of diisobutenyl succinic acid. In the formation of the polyesters, either the acids or their anhydrides may be employed. The resultant products are the same. The term "acid" as used herein includes the anhydride of the acid.

In preparing the polyesters, the reaction mixture of dihydric alcohol and the acids can be heated, preferably under a blanket of inert gas such as carbon dioxide, nitrogen or the like, to a temperature sufficient to induce esterification, as evidenced by the evolution of water, reduction of acid value, rise of viscosity, etc. It is preferred to include a small amount of an inert diluent such as xylene or toluene in the reaction mixture. However, such diluent is not essential to the reaction. The reaction is continued with increasing temperatures, for example, up to 150 or 200° C. or thereabouts, until the evolution of water substantially ceases and the acid value of the resultant polyester is reduced to a satisfactory level for example, to a value below 50, e. g. to 10 to 25. Reaction should not be continued until infusible, insoluble polyesters are produced. The approach of the completion of the esterification reaction can normally be determined by withdrawing small samples periodically from the reaction mixture and subjecting these to viscosity and/or acidity tests as is well understood in the manufacture of conventional alkyd resins. Usually 2 to 20 hours is sufficient.

As previously indicated, a wide choice of vinylically unsaturated compounds containing a terminal >C=CH$_2$ group linked to a negative group may be used for the preparation of copolymers with the polyesters embodying di- or triisobutenyl succinic acid as herein described.

Especially valuable copolymers are obtained where the ethylenic compound is styrene. Other ethylenically unsaturated compounds of the monomer type would include divinyl benzene, alpha methyl styrene, vinyl acetate, diallyl phthalate, vinyl chloride, methyl methacrylate, acrylonitrile and many others such as disclosed in prior art including the above mentioned patents and the art cited in such patents. In general, these compounds should be compatible or soluble in the polyester, at least when the mixture thereof is heated. In most instances, they are liquid at normal atmospheric temperatures. The ethylenically unsaturated compound may constitute from about 5 to 40 or 50 per cent of the copolymerizable mixture (percentages are by weight).

If the copolymerizable mixtures are to be subjected to a substantial period of storage, for example, a week or more, it is usually preferable to include in the copolymerizable mixture, an appropriate gelation or polymerization inhibitor. A number of such inhibitors are disclosed in the prior art such as the patents above referred to. The most common ones are polyhydric phenols such as hydroquinone, tertiary butyl catechol, 3-methyl catechol and others. More recently, salts such as the halide salts of quaternary ammonium hydroxides have been found to constitute excellent inhibitors of gelation during periods of storage. Many such inhibitors are disclosed in Parker application 218,534 filed March 31, 1951, now Patent 2,593,787, and made a part hereof. The use of any of these compounds as well as others as gelation or polymerization inhibitors, of course, is within the scope of the present invention. The gelation inhibitor may be employed in any reasonable amount, for example, in a range of 0.001 to 1 per cent or even more, dependent upon the particular gelation inhibitor, the length of time to which the mixture is to be subjected to storage and such like factors.

Usually these inhibitors of gelation or premature polymerization have been added to one component of the copolymerizable mixture before the addition of the other. This is especially true where the polyester is highly viscous, or solid and therefore requires heating in order to attain adequate fluidity for ready incorporation of the ethylenically unsaturated compound. In the absence of the inhibitor, the hot mixture may tend to gel during the mixing operation. The tendency of the heated mixtures prematurely to gel during incorporation of the ethylenic compound is especially pronounced in those instances where highly reactive compounds such as styrene, are employed. In such instances, the incorporation of a small amount of an inhibitor such as trimethyl benzyl ammonium chloride in the hot polyester or 4-tertiary butyl catechol in the ethylenic compound obviates this difficulty. These same techniques may be employed in the practice of the present invention.

Where less reactive ethylenic compounds such as vinyl acetate are to be incorporated, the tendency to gel is not so pronounced. The ethylenic compound may then be added in the absence of an added inhibitor of gelling. However, if the mixture is to be stored for any great period before use, an inhibitor is still desirable.

The gelation inhibitor may be added at a temperature of about 100 to 150° C. or at such temperature as will effect rapid and complete solution of the inhibitor. The ethylenic compound can usually be added at a temperature in this same range. Any temperature is satisfactory for the latter operation if the components are adequately fluid and dissolve reasonably rapidly. The mixture containing inhibitors can be stored for long periods without gelation.

Copolymerizable mixtures of the type herein disclosed, will cure more satisfactorily if an appropriate catalyst of copolymerization is included. If the time required for polymerization or copolymerization is not essential, the mixtures may be polymerized by heat alone, or by irradiation with ultra-violet light in the absence of catalysts. However, as stated, it is usually preferable to include a catalyst. Any convenient catalyst may be employed. One of the more conventional is benzoyl peroxide. Others include lauroyl peroxide, tertiary butyl hydroperoxide and many other organic peroxides recognized by those skilled in the art. These may be employed in amount of .05 to 10 per cent by weight of the copolymerizable mixture.

In the preparation of the copolymerization mixtures, it is more common to prepare the polyester as above described, and then, while the mixture is still warm from the esterification reaction, for example, at a temperature of about 100 or 120° C., to add an appropriate gelation inhibitor such as hydroquinone, trimethyl or triethyl benzyl ammonium chloride or the like. The ethylenically unsaturated compound such as styrene or vinyl acetate can be added to the polyester containing a gelation inhibitor while the latter is sufficiently warm to attain adequate fluidity without danger of premature gelation of the mixture. Mixtures after the addition of the gelation inhibitor can be stored at normal room temperature, usually for periods of several months or even years, without danger of premature gelation.

When the copolymerizable mixtures are to be cured, a peroxide catalyst such as benzoyl peroxide, or tertiary butyl hydroperoxide is added in appropriate amount, for example, 0.1 to 1 or even 5 per cent based on the copolymerizable mixture. The copolymerizable mixtures with or without addition of fillers, but preferably containing the peroxide catalyst of copolymerization, can be introduced into molds, spread to form panels or otherwise formed into appropriate shapes and subjected to curing. Commonly, heat will be applied. For example, a temperature within the range of about 75 to 150° C. or such other temperature as will attain a reasonable rate of reaction without decomposition of the resin or undue evaporation of the constituents during the polymerization reaction is suitable. The cure can usually be completed in 2 to 90 minutes, dependent upon the thickness of the article to be formed, the temperature and such factors. The articles can be baked for an additional period, e. g. ½ to 2 hours to attain further hardening. Temperatures up to 200° C. may be so employed under proper molding conditions.

The application of the principles of the invention is illustrated by the following examples:

EXAMPLE I

A mixed polyester of triisobutenyl succinic anhydride, maleic anhydride and diethylene glycol was prepared from the following charge:

| | Grams |
|---|---|
| Triisobutenyl succinic anhydride | 1,064 |
| Maleic anhydride | 98 |
| Diethylene glycol | 543 |
| Xylene | 300 |

The mixture was heated with refluxing until a relatively low acid value was attained. Heating of the reaction mixture, of course, began at room temperature. The following constitutes a time-temperature log of the reaction.

| Time | Temp., ° C. | Acid No. |
|---|---|---|
| 3:15 p. m | [1] RT | |
| 4:00 | 162 | |
| 5:00 | 177 | |
| 6:00 | 185 | |
| 8:00 | 191 | |
| 9:00 | 185 | |
| 10:00 | 185 | |
| 11:00 | 188 | |
| 12:00 | 191 | |
| 7:30 a. m | RT | |
| 10:00 | 185 | 22.8 |
| 11:15 | 180 | 20.1 |
| 12:30 | 183 | 19 |
| 1:30 | 185 | 17.4 |
| 2:30 | 184 | 17.6 |
| 3:00 | 195 | |

[1] RT—room temperature.

It is to be observed that the heating operation began at 3:15 in the afternoon and was discontinued at 12 midnight. Heating was resumed the following morning at 7:30 a. m. with the mixture again at room temperature and the reaction was concluded at 3:00 p. m. in the afternoon. The reaction product was then blown with inert gas, e. g. combustion gas from burning butane in air to remove xylene and water.

The acid number of the polyester was 19.7, the viscosity was D plus on the Gardner-Holdt scale. The viscosities given in this and the other examples herein, were taken on a solution of the resin in mono-ethyl ether of ethylene glycol at a total solids content of 60% by weight and at a temperature of 25° C. Inhibitor of polymerization or gelation was then added in accordance with the following schedule:

Styrene was added to the polyester which was at a temperature of about 100° C. and contained hydroquinone as an inhibitor. The mixture was of the following composition:

| | Grams |
|---|---|
| Polyester | 500 |
| Styrene | 500 |
| Hydroquinone (inhibitor) | 0.075 |

The mixture has a viscosity of A— on the Gardner-Holdt scale. The mixture was cured in appropriate molds in the presence of 1% by weight of benzoyl peroxide. Test samples were cured in cells or molds made up from glass plates spaced 0.25 inch by rubber spacer strips. The curing schedule was 1 hour at 170° F. and 1 hour at 250° F. This apparatus and curing schedule were adhered to in the examples to follow.

The product had the following properties:

| | |
|---|---|
| Water absorption_____percent__ | 0.30 |
| Stiffness [1]_____lbs. per sq. inch__ | 26,500 |
| Tensile strength_____lbs. per sq. inch__ | 1,500 |
| Elongation _____percent__ | 157 |

[1] Stiffness was determined upon a cantilever beam sample in accordance with A. S. T. M. methods. Stiffness when hereinafter referred to, is by the same method.

EXAMPLE II

In this example, a mixed polyester of propylene glycol and a mixture of maleic anhydride and triisobutenyl succinic anhydride was prepared from a mixture of the following composition:

| | Grams |
|---|---|
| Maleic anhydride | 294 |
| Triisobutenyl succinic anhydride | 798 |
| Propylene glycol | 508 |
| Xylene as an inert diluent | 200 |

Heating of this mixture was started at 3:05 in the afternoon at room temperature and the time temperature log then proceeded as follows:

| Time | Temp., ° C. | Acid No. |
|---|---|---|
| 3:05 p. m | RT | |
| 3:40 | 170 | |
| 5:30 | 183 | |
| 7:00 | 190 | |
| 8:30 | 190 | |
| 10:00 | 191 | |
| 11:00 | 196 | |
| Heat on: 7:00 a. m | RT | |
| 8:15 | 200 | 32 |
| 9:45 | 190 | 31.9 |
| Started blowing: 9:55 | 195 | |
| 10:25 | 194 | |

It will be observed that the heating operation was discontinued at 11:00 p. m. and was again resumed at 7:00 a. m. At the conclusion of the esterification reaction, volatiles including water and residual xylene were blown off. Blowing started at 9:55 a. m. and concluded at 10:25 a. m. The resultant polyester had an acid number of 30.2.

A charge of the foregoing polyester and styrene was made up as follows:

| | Grams |
|---|---|
| Polyester | 600 |
| Styrene | 300 |
| A 66.6% water solution of trimethyl benzyl ammonium chloride | 1.5 |
| Quinone | 0.009 |

Samples of this material were admixed with 1% by weight of benzoyl peroxide and the resultant mixtures were cured in molds in the manner described in Example I. The properties of the cured products were as follows:

| | |
|---|---|
| Flexural strength | 13,560 |
| Modulus of elasticity | 460,000 |
| Water absorption_____percent by weight__ | 0.24 |

EXAMPLE III

In this example, a mixed polyester of 2-ethyl-hexandiol-1,3 and a mixture of triisobutenyl succinic anhydride and maleic anhydride was prepared. The reaction mixture was of the following composition:

| | Grams |
|---|---|
| Triisobutenyl succinic anhydride | 1,064 |
| Maleic anhydride | 196 |
| 2-ethylhexandiol-1,3 | 920 |
| Xylene as an inert diluent | 300 |

Esterification was effected by refluxing the mixture according to the following time-temperature schedule which started at room temperature at 8:15 in the morning:

| Time | Temp. | Acid No. |
|---|---|---|
| 8:15 a. m | RT | |
| 8:50 | 160 | |
| 10:00 | 175 | |
| 11:30 | 184 | |
| 2:00 p. m | 190 | |
| 5:00 | 191 | 31 |
| 6:00 | 190 | 30 |
| 7:30 | 191 | 28 |
| 8:30 | 192 | 27 |
| 9:30 | 191 | 26 |
| 10:30 | 192 | 24.7 |
| 11:45 | 191 | 23.8 |
| Heat on: 7:30 a. m | RT | |
| 9:15 | 194 | 21.4 |
| 10:15 | 194 | 19.5 |
| 11:30 | 195 | 19.6 |
| 12:00 | 190 | |

It will be observed that heating was continued until 11:45 p. m. at which time it was discontinued until 7:30 the following morning. At the conclusion of the reaction, volatile constituents were blown off to provide a product having an acid number of 22.2 and a viscosity of E plus on the Gardner-Holdt scale. This polyester was made up into the following copolymerizable mixture:

| | Grams |
|---|---|
| Polyester | 500 |
| Styrene | 500 |
| Hydroquinone | 0.075 |

The mixture was suitable for curing to form resinous products in the manner described in Example I.

EXAMPLE IV

In this example, a polyester was prepared from propylene glycol and a mixture of maleic anhydride and triisobutenyl succinic anhydride of the following composition:

| | Pounds |
|---|---|
| Propylene glycol | 13.65 |
| Triisobutenyl succinic anhydride | 21.45 |
| Maleic anhydride | 7.9 |
| Xylene as an inert diluent | 4.5 |

In preparing the charge, the propylene glycol, etc., was placed in a container at 12:30 a. m. The temperature-time schedule was as follows:

| Temp., ° F. | Time | Acid No. | Viscosity |
|---|---|---|---|
| RT | 12:30 a. m | | |
| 140 | 3:00 | | |
| 145 | 4:00 | | |
| 149 | 5:00 | | |
| 150 | 6:00 | | |
| 153 | 7:00 | | |
| 155 | 8:00 | | |
| 159 | 9:00 | | |
| 160 | 10:00 | 101.9 | |
| 168 | 12:00 Noon | 87.9 | |
| 170 | 1:00 p. m | 75.3 | |
| 171 | 3:00 | 65.3 | |
| 176 | 5:00 | 51.6 | |
| 180 | 8:00 | 40.0 | |
| 180 | 9:45 | 36.1 | |
| 180 | 11:15 | 32.0 | |
| 180 | 12:15 a. m | 31 | |
| 185 | 12:30 | | |
| 195 | 12:50 Blowing Started | | |
| 195 | 1:15 | | E— |
| 195 | 2:15 | | F— |
| 195 | 3:15 | | F |
| 192 | 6:30 | | H |
| | 7:40 Dropped | | I |

The final acid number was 9.5.

To 30.5 pounds of the polyester prepared as above described and at a temperature of 311° F. were added 23.6 grams of trimethyl benzyl ammonium chloride as a 66.6% solution in water. The polyester was then cooled over a period of 15 minutes to 240° F. at which point 15.1 pounds of styrene were added and the mixture was further cooled over a period of 35 minutes to 90° F. at which point 21.0 milliliters a 1% by weight of quinone in styrene, were added.

Samples of the foregoing material were admixed with 1%, based upon the copolymerization mixture, of benzoyl peroxide and cures were effected in the manner previously described in Example I.

EXAMPLE V

In this example, a polyester which was a mixed ester of 1,5-pentanediol and a mixture of maleic anhydride and triisobutenyl succinic anhydride was prepared. The initial batch was of the following content:

| | Grams |
|---|---|
| Triisobutenyl succinic anhydride | 1,064 |
| Maleic anhydride | 98 |
| 1,5-pentanediol | 533 |
| Xylene | 300 |

Esterification was effected according to the time-temperature schedule:

| Time | Temp., ° C. | Acid No. |
|---|---|---|
| 3:15 p. m | RT | |
| 4:05 | 160 | |
| 5:00 | 171 | |
| 6:00 | 185 | |
| 8:00 | 190 Xylene added (55 ML) | |
| 9:00 | 180 | |
| 10:00 | 182 | |
| 11:00 | 184 | |
| 12:00 | 186 | |
| 7:30 a. m | RT | |
| 10:00 | 185 | 21 |
| 11:30 | 185 | 19 |
| 12:30 | 184 | 16.5 |
| 2:00 | 186 | 16.1 |
| 2:30 | 186 | 16 |
| 3:00 | 195—30 minutes blowing | |

It is to be observed that the reaction was interrupted at midnight and was resumed again at room temperature at 7:30 the following morning. It is also to be understood that when the temperature reached 190° a 55 milliliter portion of xylene was added. At the conclusion of the heating operation, the mixture was blown for 30 minutes with inert gas, namely a combustion gas from the burning of butane in air for purposes of eliminating volatile reaction products such as water or any xylene remaining in the mixture. The reaction product had an acid value of 17 and was of a viscosity of E plus on the Gardner-Holdt scale.

A copolymerizable mixture comprising 500 grams of the foregoing polyester, 500 grams of styrene and 0.075 grams of hydroquinone was then prepared. Samples of the material catalyzed with 1% by weight of benzoyl peroxide were introduced into a cell mold as described in Example I and copolymerized in accordance with the schedule therein given.

The properties of the resin were:

| | | |
|---|---|---|
| Water absorption | percent | 0.21 |
| Tensile strength | lbs. per sq. inch | 1,830 |
| Stiffness | lbs. per sq. inch | 35,000 |
| Elongation | percent | 130 |

It is to be observed that this resinous product is a thermoset resin of high flexibility. It has an exceptionally low water absorption and unusually satisfactory electrical properties from the standpoint dielectric constant, low power factor, and loss factor. For example, the dielectric strength of the material was 470 volts per mil on a test sample 145 mils thick and at a temperature of 78° F. and a relative humidity of 70%; the power factor was 0.0195, the dielectric constant was 2.95 and the loss factor was 0.0575, all measured at 50 kilocycles, a temperature of 86° F. and at a relative humidity of 55%. The material is excellent especially for those applications where good electrical properties, good resistance to moisture and high flexibility are required. For example, the material is very satisfactory for potting electrical coils, for coating electrical wiring or for coating fabrics and such like applications where good electrical properties are desired.

EXAMPLE VI

In accordance with this example, a polyester of diisobutenyl succinic anhydride, maleic anhydride and propylene glycol was prepared. The reaction mixture comprised:

| | Grams |
|---|---|
| Maleic anhydride | 490 |
| Diisobutenyl succinic anhydride | 1,050 |
| Propylene glycol | 847 |
| Xylene | 400 |

The mixture was esterified by heating in the manner already described in connection with the preceding examples. Heating was continued until an acid number of 38 was attained.

The polyester was incorporated into a copolymerizable mixture of the following formula:

| | |
|---|---|
| Polyester | 600 grams. |
| Styrene | 300 grams. |
| Trimethyl benzyl ammonium chloride. | 0.1% by weight based upon total resin. |
| Quinone | 0.001% by weight based upon total resin. |

The mixture when cured in a glass cell of the type described in the foregoing examples, had a flexural strength of 14,080 pounds per square inch. The water absorption was 0.28%.

EXAMPLE VII

A polymerizable polyester was prepared from a batch comprising:

| | Grams |
|---|---|
| Maleic anhydride | 490 |
| Triisobutenyl succinic anhydride | 1,335 |
| Propylene glycol | 847 |
| Xylene | 400 |

The mixture was heated in the manner described in connection with the foregoing examples until an acid value of 28.5 was attained, at which time the material was made up into a batch of the composition:

| | |
|---|---|
| Polyester | 600 grams. |
| Styrene | 300 grams. |
| Trimethyl benzyl ammonium chloride. | 0.1% based upon the total resin. |
| Quinone | 0.001 based upon the total resin. |

The material was admixed with benzoyl peroxide in a proportion of 1% by weight based upon the total mixture and samples were then cured in a glass cell mold of the type already described. The product had a flexural strength of 13,200 pounds per square inch and a water absorption of 0.22% by weight.

EXAMPLE VIII

A mixed polyester comprising diisobutenyl succinic anhydride and maleic anhydride esterified with propylene glycol was prepared from the following mixture:

| | Grams |
|---|---|
| Maleic anhydride | 490 |
| Diisobutenyl succinic anhydride | 1,050 |
| Propylene glycol | 847 |
| Xylene | 300 |

The foregoing composition was heated in the manner previously described to provide a polyester of an acid value of 32. The resultant polyester was made up into a copolymerizable mixture of the composition:

| | Grams |
|---|---|
| Polyester | 600 |
| Styrene | 300 |
| Trimethyl benzyl ammonium chloride | 1.5 |
| Quinone | 0.009 |

The time-temperature log for preparation of the product was as follows:

| Time | Temp., °C. | Acid No. |
|---|---|---|
| 3:00 p. m. | RT | |
| 3:50 | 170 | |
| 5:45 | 160 | |
| 8:00 | 168 | |
| 9:45 | 174 | |
| 11:00 | 175 | |
| 7:00 a. m. | | |
| 8:20 | 135 | 60.3 |
| 9:30 | 177 | 59.6 |
| 10:35 | 179 | 43.4 |
| 11:30 | 182 | 41.7 |
| 1:15 p. m. | 183 | 40.0 |
| 2:20 | 190 | 35.2 |
| 3:15 | 195 | 35.2 |
| 3:30 | 195 | |
| 4:00 | 198 | |

Samples of this mixture were admixed with benzoyl peroxide in a proportion of 1% by weight and were cured in a glass cell in accordance with the preceding examples. The product had a flexural strength of 13,880 pounds per square inch, a modulus of elasticity of 408,000 pounds per square inch and a water absorption of 0.27% by weight.

The present invention includes the substitution of fumaric acid for all or a part of the maleic acid in the previous examples. Other alpha-beta ethylenically unsaturated acids and notably those including the dicarboxylic groups in alpha-beta relation are within the scope of the present invention and may be substituted for maleic anhydride in the preceding examples. It is also contemplated to substitute vinyl acetate, diallyl phthalate, methyl methacrylate, acrylonitrile, and other ethylenic compounds containing an ethylenic group in terminal position for the styrene disclosed in the preceding examples.

EXAMPLE IX

Substitute fumaric acid for maleic anhydride in the polyester of Example II and proceed as in the former example.

The mixed polyester of propylene glycol and the mixture of triisobutenyl succinic anhydride and fumaric acid may be copolymerized with styrene to form a copolymer resin.

The resins prepared as herein described are characterized by good hardness and flexibility and the electrical characteristics thereof are outstanding. For purposes of demonstrating the superior electrical characteristics of resins comprising copolymers of an ethylenically unsaturated compound and mixed polyesters of a glycol and mixtures of an alpha-beta ethylenically unsaturated, alpha-beta dicarboxylic acid and diisobutenyl or triisobutenyl succinic acid, a series of samples were prepared.

The first group was prepared in accordance with Example VIII and comprised a mixture of (A) 33 per cent by weight of styrene and (B) 67 per cent by weight of a polyester of propylene glycol and a mixture of equal molar ratios of maleic acid and diisobutenyl succinic anhydride. The acid value of the polyester was 32.

The second group of samples was composed of a polyester prepared in accordance with the provision of Example II of an acid value of 30.2 in which triisobutenyl succinic anhydride was employed along with maleic acid and propylene glycol.

For purposes of comparison, a third group of samples was prepared from a copolymerizable mixture comprising 33 per cent by weight of styrene, the rest being a polyester of propylene glycol and equal molar ratios of maleic acid and phthalic acid. The polyester in this mixture had an acid value of 45. The materials for these three sets of samples were admixed with an appropriate peroxide type catalyst namely 0.8% by weight of benzoyl peroxide added to the several mixtures and the mixtures were formed into sheets of a thickness varying between about 113 and 126 mils. The sheets were all adequately cured by application of heat.

For purposes of determining the dielectric strength, the sheets were subjected to the test specified in ASTM specification D-149-144, the temperature at the time of the test being 76° F. and the relative humidity 55 per cent.

The power factor, dielectric constant and loss factor for the samples, was determined in accordance with ASTM specification D-150-47 at a temperature of 85° F. and at a relative humidity of 76 per cent.

The results of these several tests are tabulated as follows:

TABLE A

| Dibasic acid | Diisobutenyl Succinic | Triisobutenyl Succinic | Phthalic |
|---|---|---|---|
| Breaking voltage per mil thickness | 583 | 595 | 507 |
| Power factor (at one megacycle) | 0.0125 | 0.0077 | 0.013 |
| Dielectric constant (at one megacycle) | 2.83 | 2.67 | 3.08 |
| Loss factor | 0.0354 | 0.0206 | 0.04 |

In the table, the "Dibasic acid" is the non-ethylenic acid component of the copolymerizable polyester of the mixture.

EXAMPLE X

The products of this invention may be used, as formulated in the preceding examples, without addition of fillers or reinforcing fibrous or filamentous materials; however, for many applications, it is desirable to use a reinforcing material such as glass or cotton fibers or similar fibrous products. The fibers may be used in the form of cloth, cut strands or as filaments. In the preparation of radomes, for which the products of this invention are particularly applicable, glass cloth is specified as the reinforcing material. The following procedure illustrates the preparation of such a laminate.

The liquid resin of Example IV was catalyzed with

1% by weight of benzoyl peroxide and coated on the glass cloth known as 181-114, as furnished by Owens-Corning Fiberglas Co. A laminate was laid up with twelve plies of the coated cloth and allowed to soak one-half hour at room temperature. It was then placed between cellophane and rolled to remove air bubbles. The composite was placed in a heated press with one-eighth inch spacers and cured for fifteen minutes at 170° F. and fifteen minutes at 250° F. and at 15 p. s. i. pressure. The finished laminate was stripped from the cellophane cell after cooling. It had a Barcol hardness of 65, a Rockwell M hardness of 111, and a resin content of 29% (by weight). Under the standard ASTM test, it had a flexural strength of 64,000 p. s. i. and a modulus in flexure of $27.4 \times 10^5$.

While the preparation of copolymerizable mixtures of (A) an ethylenically unsaturated monomer, such as styrene and (B) a mixed polyester of a glycol and a mixture of an alpha-beta ethylenically unsaturated, alpha-beta betadicarboxylic acid and diisobutenyl or triisobutenyl succinic acid have been especially emphasized and probably constitute an important feature of the present invention, it is also contemplated to employ the polyesters containing diisobutenyl or triisobutenyl succinic anhydride and maleic anhydride without the addition of the monomeric compound. The polyesters per se cure relatively slowly. However, in time they can be cured to form hard, durable resins.

The copolymerizable mixtures disclosed herein can be employed to coat electrical conductors such as wires, pot coils and for many other purposes in the electrical field. The material is also susceptible of other applications than in the electric field in the preparation of clear casting, laminated and molded articles, etc.

The forms of the invention herein shown and described are primarily by way of illustration. It will be apparent to those skilled in the art that numerous modifications may be made therein without departure from the spirit of the invention or the scope of the appended claims.

We claim:

1. The copolymer of low power factor, low dielectric constant and low loss factor as determined by ASTM specification D-150-47 and being of (A) an ethylenically unsaturated polymerizable compound containing the group $>C=CH_2$ linked to a negative group and (B) a polyester of a dihydric alcohol and a mixture of an alpha-beta ethylenically unsaturated dicarboxylic acid and an acid of the group consisting of diisobutenyl succinic acid and triisobutenyl succinic acid.

2. The copolymer as defined in claim 1 in which the polymerizable compound containing the group $>C=CH_2$ is styrene.

3. The copolymer of low power factor, low dielectric constant and low loss factor as determined by ASTM specification D-150-47 and being of a mixture of (A) styrene and (B) a polyester of a dihydric alcohol and a mixture of maleic acid and triisobutenyl succinic acid.

4. A mixture of (A) an ethylenically unsaturated polymerizable compound containing a $>C=CH_2$ group linked to a negative group (B) a polyester of a dihydric alcohol and a mixture of an alpha-beta ethylenically unsaturated dicarboxylic acid and an acid of the class consisting of diisobutenyl succinic acid and triisobutenyl succinic acid, the first mentioned mixture being adapted to copolymerize to form a resin of lower power factor, low dielectric constant and low loss factor as determined by ASTM specification D-150-47.

5. A copolymerizable mixture of (A) styrene and (B) a polyester of a dihydric alcohol and a mixture of maleic acid and triisobutenyl succinic acid, the first mixture being adapted to form a resinous copolymer of low power factor, low dielectric constant and low loss factor as determined by ASTM specification D-150-47.

6. An article of manufacture comprising a matrix of a copolymer of (A) styrene and (B) a mixer dihydric alcohol polyester of maleic acid and triisobutenyl succinic acid, said matrix being reinforced by filamentous materials embedded therein and being of low power factor, low dielectric constant and low loss factor as determined by ASTM specification D-150-47.

7. An article of manufacture as defined in claim 6 in which the filamentous material is glass fibers.

References Cited in the file of this patent

UNITED STATES PATENTS

| | | |
|---|---|---|
| 2,230,005 | Moser | Jan. 28, 1941 |
| 2,255,313 | Ellis | Sept. 9, 1941 |
| 2,283,214 | Kyrides | May 19, 1942 |
| 2,297,039 | Melsen | Sept. 29, 1942 |
| 2,407,479 | D'Alelio | Sept. 10, 1946 |
| 2,454,862 | Collins | Nov. 30, 1948 |
| 2,475,731 | Weith | July 12, 1949 |
| 2,593,787 | Parker | Apr. 22, 1952 |